United States Patent
Iijima

(10) Patent No.: US 10,281,884 B2
(45) Date of Patent: May 7, 2019

(54) LEARNING CONTROLLER FOR AUTOMATICALLY ADJUSTING SERVO CONTROL ACTIVITY

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 166 days.

(21) Appl. No.: 15/335,452

(22) Filed: Oct. 27, 2016

(65) Prior Publication Data

US 2017/0123385 A1   May 4, 2017

(30) Foreign Application Priority Data

Oct. 28, 2015   (JP) .................................. 2015-211940

(51) Int. Cl.
G05B 13/02   (2006.01)
G05B 19/40   (2006.01)
(Continued)

(52) U.S. Cl.
CPC ......... *G05B 13/0265* (2013.01); *G05B 19/19* (2013.01); *G05B 19/402* (2013.01);
(Continued)

(58) Field of Classification Search
CPC .. G05B 13/0265; G05B 19/19; G05B 19/402; G05B 2219/41144; G05B 2219/42141;
(Continued)

(56) References Cited

U.S. PATENT DOCUMENTS 3,682,191 A * 8/1972 Lechner, Jr. ............ F15C 1/005
 137/804
5,019,763 A * 5/1991 Komatsu ............... G05B 19/184
 318/39

(Continued)

FOREIGN PATENT DOCUMENTS

CN   1402228 A   3/2003
CN   1519673 A   8/2004

(Continued)

OTHER PUBLICATIONS

Altintas, Y.; Verl, A.; Brecher, C.; Uriarte, L. and Pritschow, G., "Machine Tool Feed Drives", 2011, CIRP Annals—Manufacturing Technology, 60, 779-796. (Year: 2011).*

(Continued)

*Primary Examiner* — Ziaul Karim
*Assistant Examiner* — Kelvin Booker
(74) *Attorney, Agent, or Firm* — Hauptman Ham, LLP

(57) ABSTRACT

A servo control system includes a position command generator, a position detector for a feed axis, a positional deviation obtainer for calculating a positional deviation, a position control loop, a band limiting filter for attenuating a high frequency component of the positional deviation, a dynamic characteristic compensation element for advancing a phase, a learning controller including the band limiting filter and the dynamic characteristic compensation element, a sine wave sweep input unit for applying a sine wave sweep to the position control loop, a frequency characteristic calculator for estimating the gain and phase of position control loop input and output signals, and a learning control characteristic evaluation function calculator for calculating an evaluation function, which indicates a position control characteristic with the learning controller based on a fre- (Continued)

quency characteristic by actual measurement and a frequency characteristic of the learning controller.

1 Claim, 5 Drawing Sheets

(51) Int. Cl.
  *G06N 99/00* (2010.01)
  *G05B 19/402* (2006.01)
  *G05B 19/19* (2006.01)
(52) U.S. Cl.
  CPC . *G06N 99/005* (2013.01); *G05B 2219/39352* (2013.01); *G05B 2219/41144* (2013.01); *G05B 2219/41166* (2013.01); *G05B 2219/42128* (2013.01); *G05B 2219/42141* (2013.01); *G05B 2219/50281* (2013.01)
(58) Field of Classification Search
  CPC ........... G05B 2219/42128; G05B 2219/41166; G05B 2219/39352; G05B 2219/50281; G06N 99/005
  See application file for complete search history.

(56) References Cited

U.S. PATENT DOCUMENTS

| | | | | |
|---|---|---|---|---|
| 5,305,230 | A * | 4/1994 | Matsumoto | G05B 13/0285 700/287 |
| 5,608,843 | A * | 3/1997 | Baird, III | G05B 13/0265 706/23 |
| 5,677,609 | A * | 10/1997 | Khan | G05B 13/027 318/274 |
| 6,097,168 | A * | 8/2000 | Katoh | 318/560 |
| 6,196,773 | B1 * | 3/2001 | Hyatt | B23B 29/03432 408/1 R |
| 2003/0139824 | A1 * | 7/2003 | Akamatsu | G05B 19/19 700/29 |
| 2006/0173571 | A1 | 8/2006 | Hosokawa et al. | |
| 2008/0218116 | A1 * | 9/2008 | Maeda | G05B 19/19 318/571 |
| 2010/0198371 | A1 * | 8/2010 | Takagi | G05B 19/042 700/44 |
| 2010/0295495 | A1 * | 11/2010 | Iwashita | G05B 19/19 318/561 |
| 2012/0059506 | A1 * | 3/2012 | Okita | G05B 13/0265 700/173 |
| 2015/0148953 | A1 * | 5/2015 | Laurent | B25J 9/163 700/250 |
| 2015/0283703 | A1 * | 10/2015 | Izhikevich | B25J 9/163 706/11 |
| 2016/0096270 | A1 * | 4/2016 | Ibarz Gabardos | B25J 9/163 700/253 |
| 2017/0090452 | A1 * | 3/2017 | Kanemaru | G05B 19/19 |
| 2017/0090459 | A1 * | 3/2017 | Koga | G05B 19/402 |
| 2018/0210406 | A1 * | 7/2018 | Shimizu | G05B 13/0265 |

FOREIGN PATENT DOCUMENTS

| | | |
|---|---|---|
| CN | 1815394 A | 8/2006 |
| CN | 1892523 A | 1/2007 |
| CN | 102385343 A | 3/2012 |
| CN | 103201944 A | 7/2013 |
| CN | 103358510 A | 10/2013 |
| CN | 104736303 A | 6/2015 |
| DE | 102013005078 A1 | 10/2013 |
| EP | 1688806 A1 | 8/2006 |
| JP | 64-53210 A | 3/1989 |
| JP | 3-282717 A | 12/1991 |
| JP | 5-35899 A | 2/1993 |
| JP | 2003-123294 A | 4/2003 |
| JP | 2006-197726 A | 7/2006 |
| JP | 2006-215740 A | 8/2006 |
| JP | WO2009019953 A1 | 10/2010 |
| JP | 4830993 B2 | 12/2011 |
| JP | 2013-203029 A | 10/2013 |
| JP | 2013-216030 A | 10/2013 |
| WO | WO2009/019953 A1 | 2/2009 |

OTHER PUBLICATIONS

Chen, Y. and Moore, K.L., "Frequency Domain Adaptive Learning Feed forward Control" Jul. 2001, Proceedings of the 2001 IEEE International Symposium on Computational Intelligence in Robotics and Automation. (Year: 2001).*

Ellis, G., "Motion System Design", Jun. 2011, Machine Design, retrieved from the Internet at "http://www.machinedesign.com/print/28312". . . (Year: 2011).*

Erkorkmaz, K. and Altintas, Y., "High Speed CNC System Design. Part III: High Speed Tracking and Contouring Control of Feed Drives", Sep. 2001, International Journal of Machine Tools and Manufacture. (Year: 2001).*

Katayama, T.; Ogawa, M. and Nagasawa, M., "High-Precision Tracking Control System for Digital Video Disk Players", Mar. 1995, IEEE Transactions on Consumer Electronics, vol. 41, No. 2. (Year: 1995).*

Kim, D.; Son, D.H. and Jeon, D., "Feed-System Autotuning of a CNC Machining Center: Rapid System Identification and Fine Gain Tuning Based on Optimal Search", Jan. 2011, Precision Engineering, 36, 339-348. (Year: 2011).*

Okwudire, C., "Modeling and Control of High Speed Machine Tool Feed Drives", Aug. 2009, Thesis for degree of Doctor of Philosophy in Mechanical Engineering at the University of British Columbia. (Year: 2009).*

Tsai, M.-S.; Yen, C.-L. and Yau, H.-T., "Integration of an Empirical Mode Decomposition Algorithm with Iterative Learning Control for High-Precision Machining", Jun. 2013, IEEE/ASME Transactions on Mechatronics, vol. 18, No. 3. (Year: 2013).*

Tadashi Inoue et al., "High Accuracy Control of Play-Back Servo Systems", vol. 101, No. 4, Apr. 1981, pp. 89-96, The Institute of Electrical Engineers of Japan. C, Tokyo, Japan.

Tsuyoshi Katayama et al., "Adaptive Learning Control Method for Optical Disk Drive Tracking Control", vol. 48, No. 8, Aug. 1994, pp. 1018-1026, The journal of the Institute of Television Engineers of Japan, Tokyo, Japan.

* cited by examiner

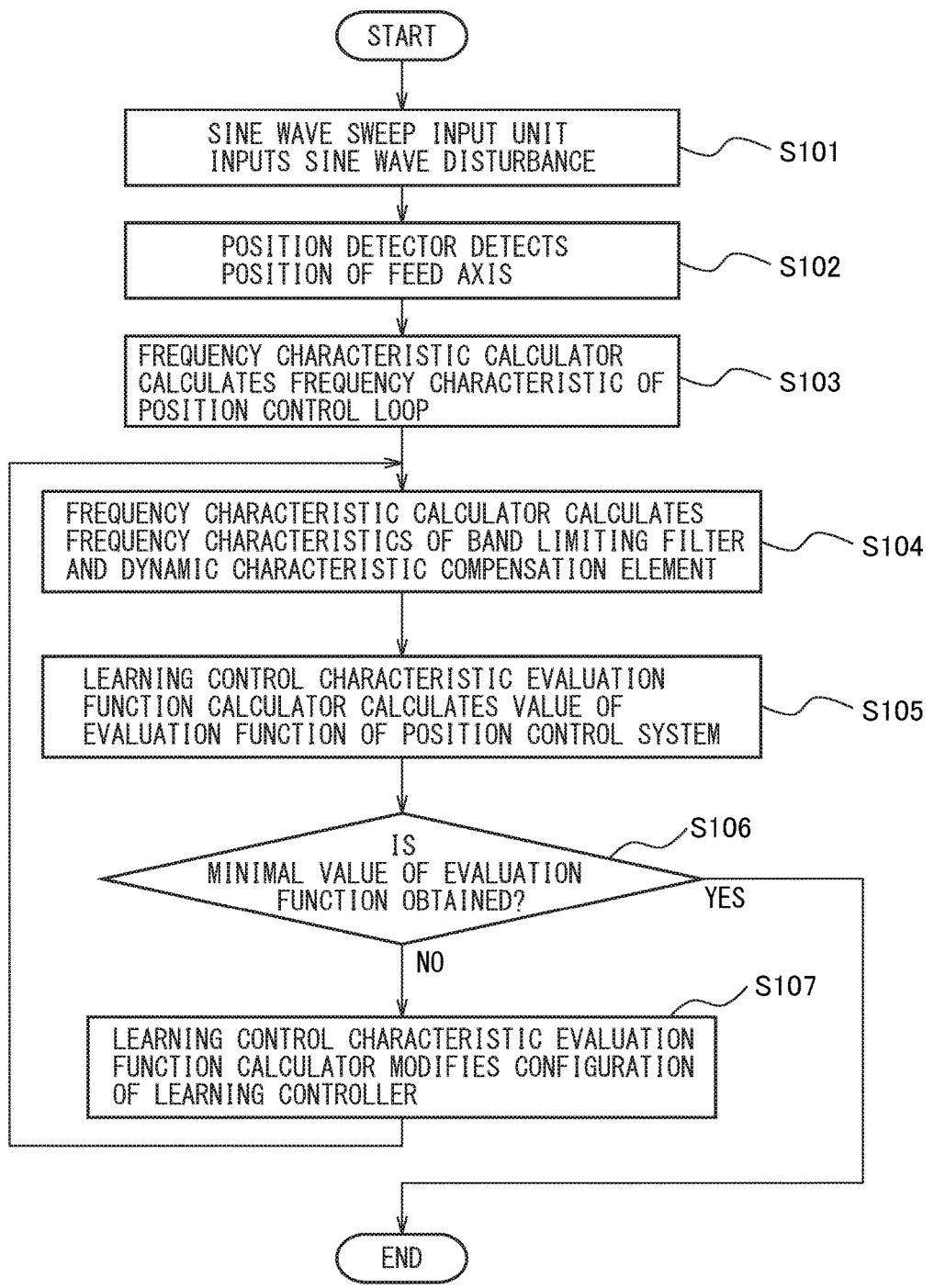

LEARNING CONTROLLER FOR AUTOMATICALLY ADJUSTING SERVO CONTROL ACTIVITY

RELATED APPLICATIONS

The present application claims priority to Japanese Patent Application Number 2015-211940 filed Oct. 28, 2015, the disclosure of which is hereby incorporated by reference herein in its entirety.

BACKGROUND OF THE INVENTION

1. Field of the Invention

The present invention relates to a servo control system, and specifically relates to a servo control system that has the function of automatically adjusting a learning controller.

2. Description of Related Art

In recent years, techniques related to learning control have been in practical use in machine tools. The learning control is, in brief, a control that optimizes a feedforward signal with respect to certain same operations. By performing the same operations in a repeated manner, the feedforward signal is updated and finally converges to a specific form. Learning is ended at that point in time, and the feedforward signal obtained by the learning control is used as is without being updated.

The principle of a high accuracy control of repeated operations using a learning control is reported (for example, Tadashi INOUE et al.: High Accuracy Control of Play-Back Servo Systems, the Institute of Electrical Engineers of Japan. C, Vol. 101, No. 4, pp. 89-96, (1981), hereinafter called "non-patent document 1"). In the non-patent document 1, an evaluation function itself is derived. However, the non-patent document 1 does not describe the technique of measuring a frequency response of servo systems and an experimental modal analysis, and hence calculates only nominal characteristics. The non-patent document 1 refers to the principle of a configuration method of a learning controller, but does not refer to the principle of a concrete adjustment.

The characteristics and stability of a learning control are also reported (for example, Tsuyoshi KATAYAMA et al.: Adaptive Learning Control Method for Optical Disk Drive Tracking Control, the Journal of the Institute of Television Engineers of Japan, Vol. 48, No. 8, pp. 1018-1026, (1994), hereinafter called "non-patent document 2".) However, the non-patent document 2 does not refer to the principle of adjusting a learning controller.

SUMMARY OF THE INVENTION

The present invention aims at providing a servo control system that can automatically adjust a servo characteristic, including a learning control, obtained from basic control system characteristics by actual measurement.

A servo control system according to an embodiment of the present invention is a servo control system for a machine tool having a feed axis driven by a servomotor. The servo control system includes a position command generator for generating a position command to drive the feed axis in a specific same operation pattern; a position detector for detecting the position of the feed axis; a positional deviation obtainer for obtaining a position command value generated by the position command generator and a position detection value detected by the position detector, and calculating a positional deviation that is the difference between the position command value and the position detection value; a position control loop including the position command generator, the position detector, and the positional deviation obtainer; a band limiting filter for attenuating a high frequency component of the positional deviation outputted from the positional deviation obtainer; a dynamic characteristic compensation element for advancing the phase of the positional deviation outputted from the band limiting filter; a learning controller including the band limiting filter and the dynamic characteristic compensation element; a sine wave sweep input unit for applying a sine wave sweep to the position control loop; a frequency characteristic calculator for estimating the gain and phase of position control loop input and output signals from the output of the position control loop at the time when sine waves are inputted to the position control loop; and a learning control characteristic evaluation function calculator for calculating an evaluation function that indicates a position control characteristic with the learning controller, based on a frequency characteristic by actual measurement calculated by the frequency characteristic calculator and a frequency characteristic of the learning controller. The learning control characteristic evaluation function calculator modifies the configuration of at least one of the band limiting filter and the dynamic characteristic compensation element that constitute the learning controller, based on the value of the evaluation function.

BRIEF DESCRIPTION OF THE DRAWINGS

The objects, features, and advantages of the present invention will be more apparent from the following description of an embodiment in conjunction with the attached drawings, wherein:

FIG. 6 is a flowchart of the operation of the servo control system according to the embodiment of the present invention.

DETAILED DESCRIPTION OF THE INVENTION

Figure 1:
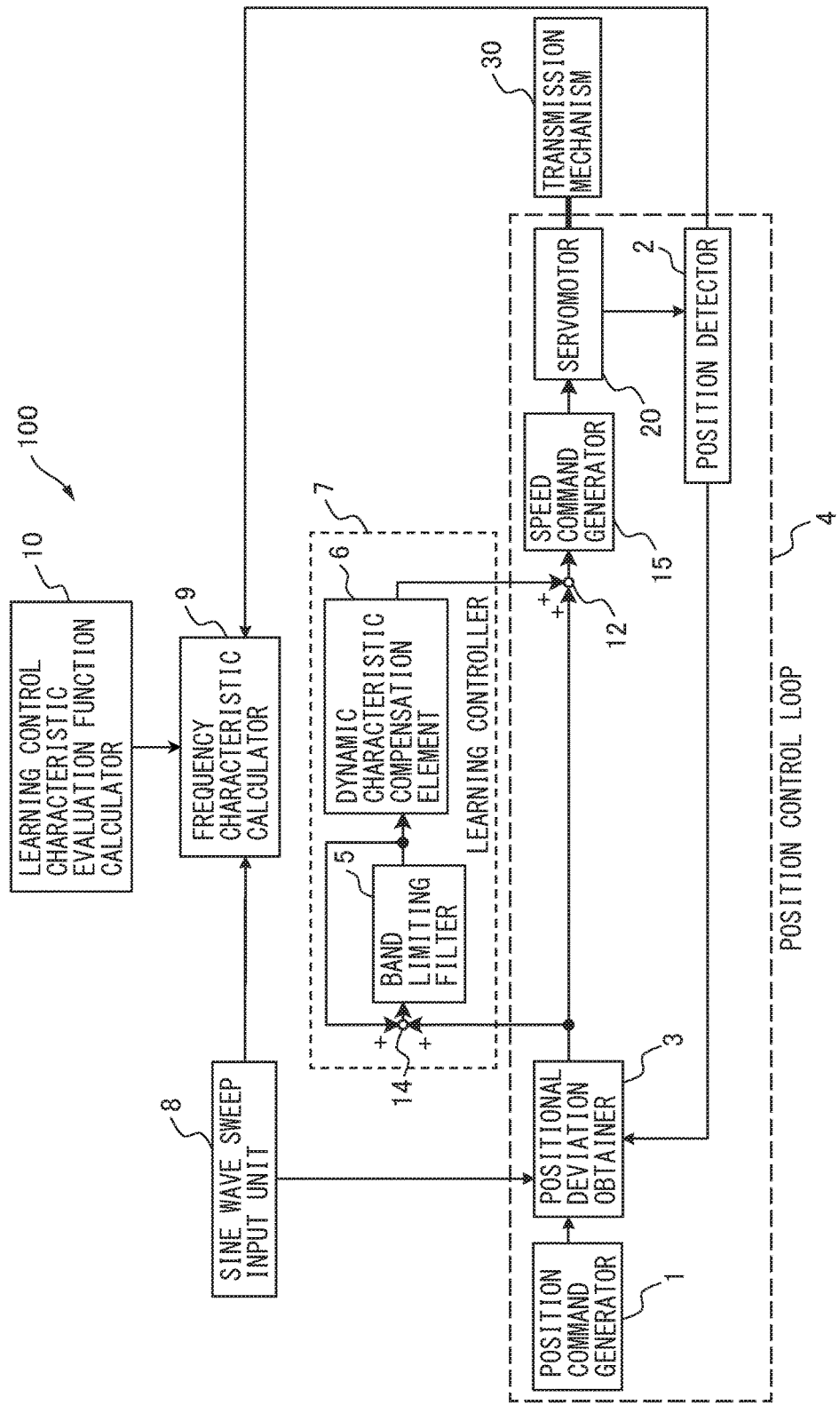
FIG. 1 is a block diagram of a servo control system according to an embodiment of the present invention.

A servo control system according to the present invention will be described below with reference to the drawings. FIG. 1 is a block diagram of a servo control system 100 according to an embodiment of the present invention. The servo control system 100 according to the embodiment of the present invention is a servo control system for a machine tool having a feed axis driven by a servomotor. The servo control system 100 includes a position command generator 1, a position detector 2, a positional deviation obtainer 3, a position control loop 4, a band limiting filter 5, a dynamic characteristic compensation element 6, a learning controller 7, a sine wave sweep input unit 8, a frequency characteristic calculator 9, and a learning control characteristic evaluation function calculator 10.

The position command generator 1 generates a position command to make a servomotor 20 drive the feed axis of the machine tool in the specific same operation pattern through a transmission mechanism 30. The position command generated by the position command generator 1 is outputted to the positional deviation obtainer 3.

The position detector 2 detects the position of the feed axis of the machine tool. An encoder or a resolver is usable as the position detector 2, but the position detector 2 is not limited thereto. The detection value of the position of the feed axis detected by the position detector 2 is outputted to the positional deviation obtainer 3.

The positional deviation obtainer 3 obtains a position command value generated by the position command generator 1 and the position detection value detected by the position detector 2, and calculates a positional deviation, that is, the difference between the position command value and the position detection value. The position command generator 1, the position detector 2, and the positional deviation obtainer 3 described above constitute the position control loop 4.

The band limiting filter 5 attenuates a high frequency component of the positional deviation outputted from the positional deviation obtainer 3. The band limiting filter 5 is a low-pass filter for cutting a signal of a high frequency range in a specific frequency range, and has the effect of stabilizing a control system.

The dynamic characteristic compensation element 6 advances the phase of the positional deviation outputted from the band limiting filter 5. The dynamic characteristic compensation element 6 is a filter that advances the phase of a signal of a high frequency range in a specific frequency range and increases a gain, and thus has the function of compensating a delay in the control system and a reduction in the gain. The band limiting filter 5 and the dynamic characteristic compensation element 6 described above constitute the learning controller 7.

The sine wave sweep input unit 8 applies a sine wave sweep to the position control loop 4. For example, the sine wave sweep input unit 8 may input a disturbance of sine waves to the positional deviation obtainer 3, which constitutes the position control loop 4. However, the sine wave sweep is not limited to this example.

The frequency characteristic calculator 9 estimates the gain and phase of position control loop input and output signals from the output of the position control loop 4 at the time when the sine waves are inputted to the position control loop 4.

The frequency characteristic calculator 9 may represent the frequency characteristic of the position control loop 4 using one rigid body mode and at least one resonance mode.

The learning control characteristic evaluation function calculator 10 calculates an evaluation function that indicates a position control characteristic with the learning controller based on the frequency characteristic by actual measurement calculated by the frequency characteristic calculator 9 and the frequency characteristic of the learning controller 7. The learning control characteristic evaluation function calculator 10 modifies the configuration of at least one of the band limiting filter 5 and the dynamic characteristic compensation element 6, which constitute the learning controller 7, based on the value of the evaluation function. The calculation of the evaluation function and the like will be described later.

Figure 2:
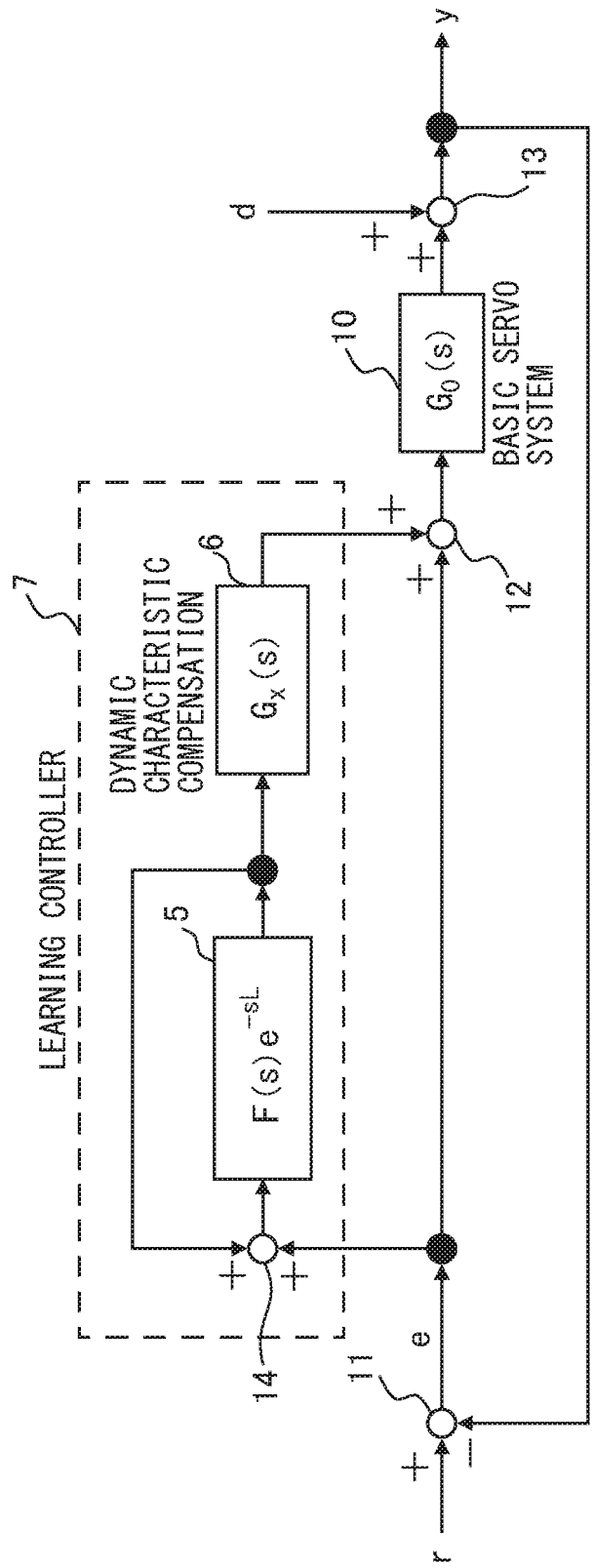
FIG. 2 is a block diagram of a learning controller of the servo control system according to the embodiment of the present invention.

Next, the configuration of the learning controller 7 will be described with reference to FIG. 2. Upon inputting a position command r to a subtracter 11, the subtracter 11 calculates a positional deviation e that is the difference between the position command r and an actual position y detected by the position detector. An adder 14 of the learning controller 7 adds a correction amount of a previous pattern period stored in a delay memory (not shown) provided in the band limiting filter 5 to the positional deviation e. The band limiting filter 5 applies a filtering process to the output of the adder 14 to obtain a correction amount. The band limiting filter 5 is represented by $F(s)e^{-SL}$, using a learning period L. The dynamic characteristic compensation element ($G_x(s)$) 6 compensates a phase delay and a gain reduction of an object to be controlled, and the learning controller 7 outputs a correction amount to an adder 12. The second adder 12 adds this correction amount to the positional deviation e. A speed command generator 15 multiplies the sum of the correction amount and the positional deviation e by a position gain $G_0(s)$ of a normal servo (position and speed control system), to generate a speed command. Note that, FIG. 2 shows an example in which an adder 13 adds a disturbance d to the speed command.

Next, how the learning control characteristic evaluation function calculator 10 calculates the evaluation function, which indicates the position control characteristic with the learning controller, based on the frequency characteristic by actual measurement calculated by the frequency characteristic calculator 9 and the frequency characteristic of the learning controller 7 will be described.

First, it has been discovered that, due to the provision of the learning controller, each angular frequency component of a final deviation after a lapse of sufficient time with synchronous input significantly reduces the final deviation, with respect to the control deviation of a basic servo system. Also, in a filtering range of $|F(j\omega)| \ll 1$, the characteristic of the final deviation depends on the response of the basic servo system (non-patent document 1). Note that, the synchronous input refers to that r+d has a fixed value relative to the learning period L, or a period is equal to the learning period L or an integral submultiple of the learning period L.

Here, $G(j\omega)$ is represented by the following equation (1):

$$G(j\omega) = \frac{G_x(j\omega)G_0(j\omega)}{1 + G_0(j\omega)} \qquad (1)$$

An index $A_T(\omega)$ that represents the convergence of a transient deviation is represented by the following equation (2):

$$A_T(\omega) = |F(j\omega)[1 - G(j\omega)]| \qquad (2)$$

Figure 3:
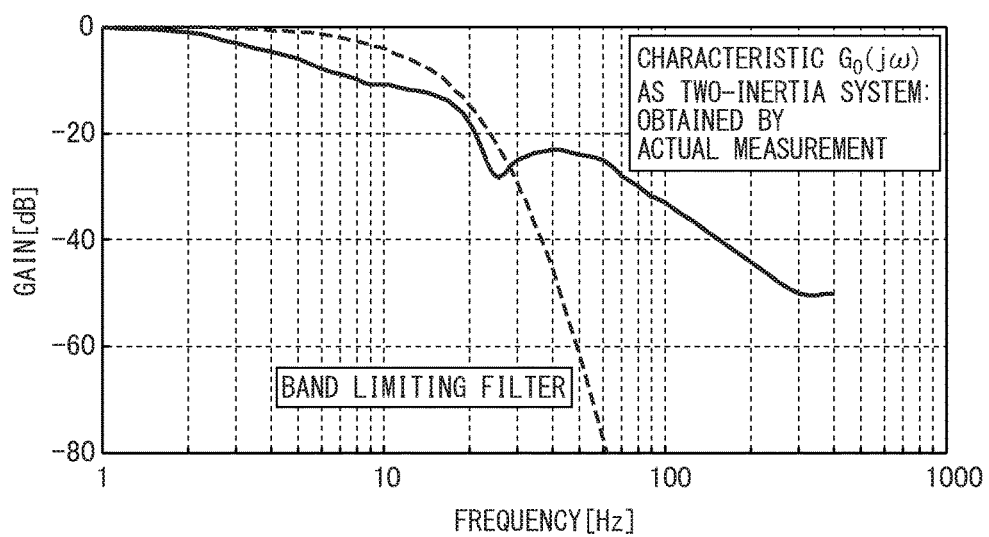
FIG. 3 is a graph showing the frequency characteristics of a normal servo and a band limiting filter in the servo control system according to the embodiment of the present invention.

FIG. 3 shows the frequency characteristics of the band limiting filter $F(j\omega)$ and the gain $G_0(j\omega)$ of the normal servo. The gain $G_0(j\omega)$ is a characteristic as a two-inertia system and obtained by actual measurement.

According to the equation (2), the lower the index $A_T(\omega)$, the quicker a transient response component converges at a root in the vicinity of $j\omega$. "$A_T = 1$" indicates that the amplitude of the response component is constant without converging.

Here, $G_0$ is measurable, and $G_x$ and F can be defined by mathematical expressions. Thus, $A_T$ can be calculated based on actual measurement. Therefore, according to the servo control system of the embodiment of the present invention, it is possible to measure a servo-control characteristic with the learning controller, including its mechanical characteristics.

Figure 4:
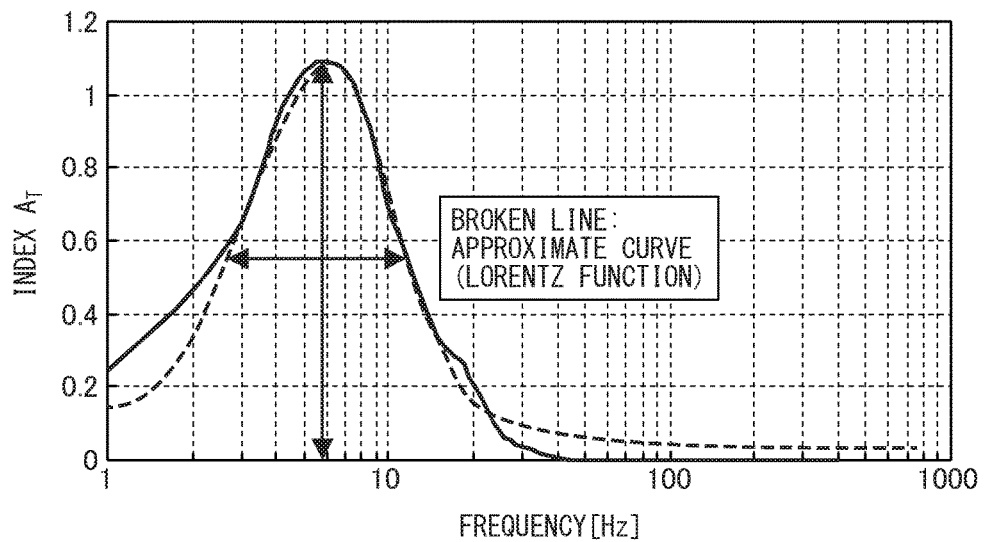
FIG. 4 is a graph showing an example of the frequency characteristic of an index $A_T$, which indicates the convergence of a transient deviation in the learning controller of the servo control system according to the embodiment of the present invention.

FIG. 4 shows an example of the frequency characteristic of the index $A_T$, which indicates the convergence of the transient deviation in the learning controller of the servo control system according to the embodiment of the present invention. In FIG. 4, a solid line represents the index $A_T$, and a broken line represents an approximate curve (the Lorentz function). An evaluation value is calculated from the approximate curve.

The evaluation value (evaluation function) is calculated by the following expression (3):

Evaluation function=Peak height/Half width (3)

In FIG. 4, a longitudinal double-headed arrow represents a peak height, and a horizontal double-headed arrow represents a half width. Whenever the evaluation value is calculated, an adjustment is made arithmetically so as to minimize the evaluation value (evaluation function).

Figure 5:
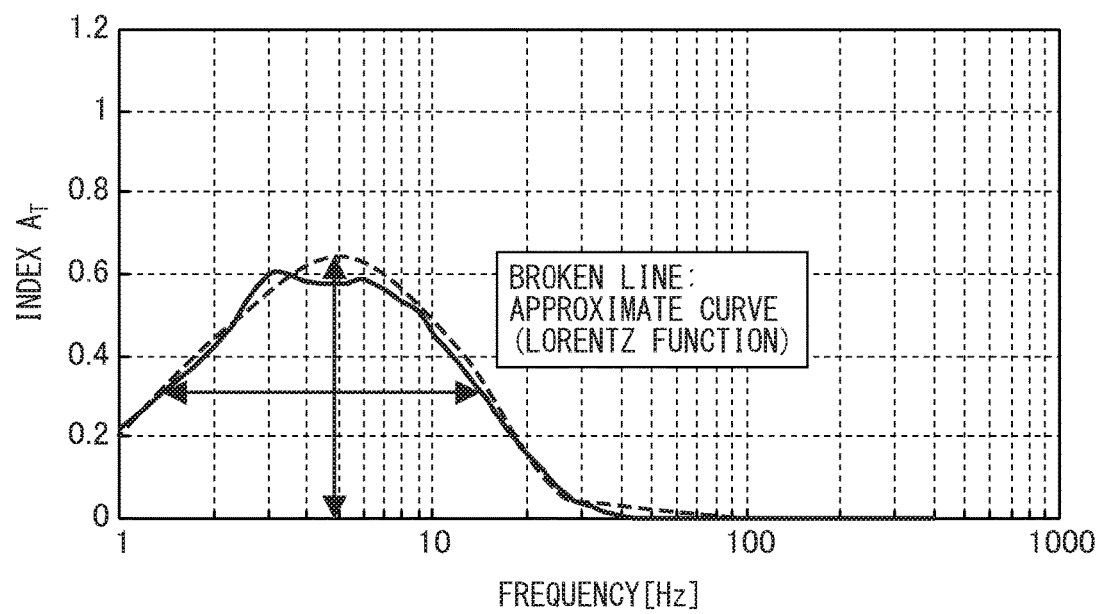
FIG. 5 is a graph showing another example of the frequency characteristic of the index $A_T$, which indicates the convergence of the transient deviation in the learning controller of the servo control system according to the embodiment of the present invention.

The learning control characteristic evaluation function calculator 10 modifies the configuration of at least one of the band limiting filter 5 and the dynamic characteristic compensation element 6, which constitute the learning controller 7, so as to minimize the evaluation value of the expression (3). FIG. 5 shows another example of the frequency characteristic of the index $A_T$, which indicates the convergence of the transient deviation in the learning controller of the servo control system according to the embodiment of the present invention, after the configurations of the band limiting filter 5 and the dynamic characteristic compensation element 6 are modified. In FIG. 5, an approximate curve has a decreased peak height and an increased half width, as compared with those in FIG. 4, thus resulting in a reduction in the value of the evaluation function. In this manner, the configurations of the band limiting filter 5 and the dynamic characteristic compensation element 6 are modified so as to minimize the evaluation value.

Next, the operation of the servo control system according to the embodiment of the present invention will be described with reference to a flowchart of FIG. 6. First, in step S101, the sine wave sweep input unit 8 inputs a sine wave disturbance to the position control loop 4. For example, the sine wave sweep input unit 8 inputs a disturbance of sine waves to the positional deviation obtainer 3, which constitutes the position control loop 4.

Next, in step S102, the position detector 2 detects the position of the feed axis of the machine tool. The detection value of the position of the feed axis detected by the position detector 2 is outputted to the positional deviation obtainer 3.

Next, in step S103, the frequency characteristic calculator 9 calculates the frequency characteristic of the position control loop 4. That is to say, the frequency characteristic calculator 9 estimates the gain and phase of position control loop input and output signals from the output of the position control loop 4 at the time when the sine waves are inputted to the position control loop 4.

Next, in step S104, the frequency characteristic calculator 9 calculates the frequency characteristics of the band limiting filter 5 and the dynamic characteristic compensation element 6.

Next, in step S105, the learning control characteristic evaluation function calculator 10 calculates the value of the evaluation function of the position control system. That is to say, the learning control characteristic evaluation function calculator 10 calculates the evaluation function, which indicates the position control characteristic with the learning controller, based on the frequency characteristic by actual measurement calculated by the frequency characteristic calculator 9 and the frequency characteristic of the learning controller 7. The evaluation function is represented by the above expression (3).

Next, in step S106, the learning control characteristic evaluation function calculator 10 determines whether or not a minimal value of the evaluation function is obtained. When the minimal value of the evaluation function is not obtained, the operation returns to step S104. The learning control characteristic evaluation function calculator 10 modifies the configuration of at least one of the band limiting filter 5 and the dynamic characteristic compensation element 6, which constitute the learning controller 7, so as to minimize the evaluation value of the expression (3), and continues calculating the evaluation function. On the other hand, when the minimal value is obtained, the operation is ended.

As described above, the servo control system according to the embodiment of the present invention optimizes a servo-control characteristic having the learning controller measured with its mechanical characteristics, thus allowing a quantitative stability evaluation and optimization using offline calculation. Therefore, the servo control system according to the embodiment of the present invention eliminates trial and error in the adjustment of a learning control.

What is claimed is:

1. A servo control system for a machine tool having a feed axis driven by a servomotor, the servo control system comprising:
   a position command generator configured to generate a position command to drive the feed axis in a specific operation pattern;
   a position detector configured to detect a position of the feed axis;
   a positional deviation obtainer configured to
      receive a position command value of the position command generated by the position command generator and a position detection value of the position of the feed axis detected by the position detector, and
      calculate a positional deviation that is the difference between the position command value and the position detection value;
   a position control loop including the position command generator, the position detector, and the positional deviation obtainer;
   a band limiting filter configured to attenuate a high frequency component of the positional deviation outputted from the positional deviation obtainer;
   a dynamic characteristic compensation element configured to advance the phase of the positional deviation outputted from the band limiting filter;
   a learning controller including the band limiting filter and the dynamic characteristic compensation element, wherein the learning controller is configured to output a correction amount;
   a sine wave sweep input unit configured to apply a sine wave sweep to the position control loop;
   a frequency characteristic calculator configured to estimate the gain and phase of position control loop input and output signals from the output of the position control loop at the time when sine waves are inputted to the position control loop; and
   a learning control characteristic evaluation function calculator configured to calculate an evaluation function that indicates a position control characteristic with the learning controller, based on
a frequency characteristic by actual measurement calculated by the frequency characteristic calculator and
a frequency characteristic of the learning controller,
wherein
the learning control characteristic evaluation function calculator is configured to modify the configuration of at least one of the band limiting filter and the dynamic characteristic compensation element that constitute the learning controller, based on the value of the evaluation function,
the learning control characteristic evaluation function calculator is configured to adjust at least one of the band limiting filter and the dynamic characteristic compensation element that constitute the learning controller, so as to minimize the value of the evaluation function, and
the evaluation function is calculated using a peak height and a half width of the frequency characteristic of an index, which indicates the convergence of a transient deviation in the learning controller by the following expression:

Evaluation function=Peak height/Half width, and the servo control system further comprises a speed command generator configured to
add the correction amount outputted by the learning controller to the positional deviation outputted by the positional deviation obtainer,
multiply a sum of the correction amount and the positional deviation by a positional gain to generate a speed command, and
output the generated speed command to the servomotor to control the servomotor.

\* \* \* \* \*